United States Patent Office 2,913,318
Patented Nov. 17, 1959

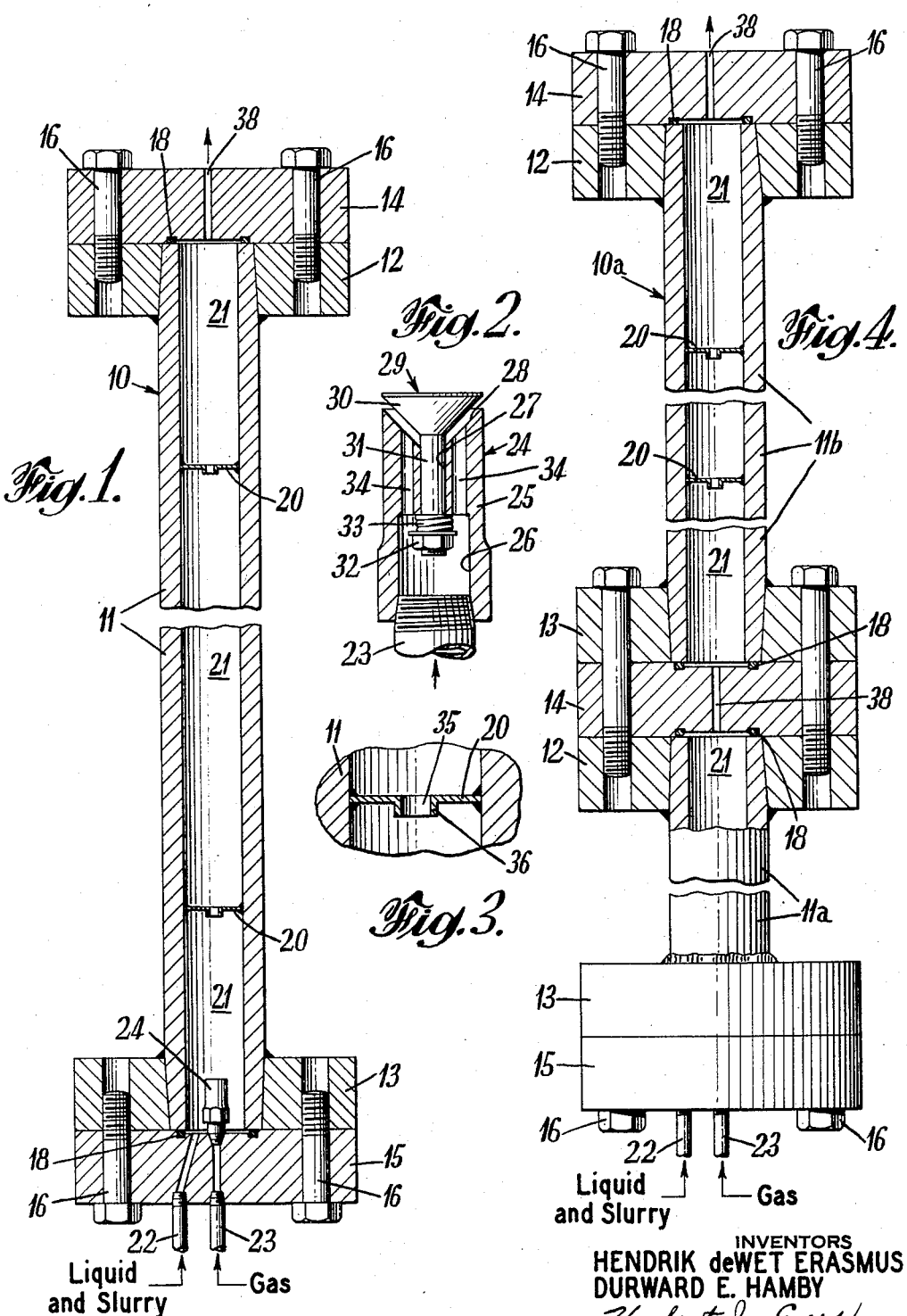

2,913,318

COLUMN-TYPE REACTOR

Hendrik de Wet Erasmus and Durward E. Hamby, Lewiston, N.Y., assignors to Union Carbide Corporation, a corporation of New York Application February 8, 1955, Serial No. 486,798

1 Claim. (Cl. 23—284)

This invention relates to an improved column-type reactor, and more particularly concerns an improved apparatus and method for promoting dispersion of liquid and gaseous reactants in a reaction chamber.

The dispersion of liquid and gaseous reactants in a reaction chamber generally involves the passage of the gas phase through a mass of liquid under such conditions including velocity that some of the liquid is maintained in a state of turbulent suspension in the gas. However, in some instances, as for example in the production of calcium formate by inter-reacting calcium hydroxide slurry with gaseous carbon monoxide, the aforesaid technique presents inherent disadvantages. There is a tendency for the interdispersed liquids to form larger drops and bubbles, and thus reduce the reactive surface area. To maintain the reactants in intimate contact, supplementary agitating devices are required. As a consequence, reaction time in the production of calcium formate is lengthy and costly.

It is, therefore, an important object of the present invention to provide an improved means for dispersing liquid and gaseous reactants in a reaction chamber.

Another important object of the present invention is to provide an improved apparatus for controlling the reaction between a liquid and a gas, such as a slurry of calcium hydroxide and gaseous carbon monoxide, whereby maximum product yields are obtained in a minimum of time.

Yet another important object of the invention is to provide in the production of calcium formate, an improved apparatus which employs a series of reaction zones that are self-regulating, easy to operate, relatively simple and inexpensive to construct, and which has no moving parts.

A preferred and practical embodiment of the invention is shown in the accompanying drawings in which:

Fig. 1 is a sectional, elevational view of a reaction chamber embodying the principles of the invention;

Fig. 2 is an enlarged sectional view of a gas dispersion valve employed in the apparatus illustrated in Fig. 1;

Fig. 3 is an enlarged sectional view of the gas dispersion nozzle used in the apparatus shown in Fig. 1; and Fig. 4 is a modification of the apparatus shown in Fig. 1.

Referring now to Fig. 1. A column-type reactor 10 constructed in accordance with the present invention, may comprise an elongated cylindrical tube or column 11 having end flanges 12 and 13, and provided with end plates 14 and 15 secured respectively to the end flanges by bolts 16. Sealing gaskets 18 disposed between each of the end plates 14 and 15, and its associated flanged ends 12 and 13, prevent the leakage of column material along the line of joinder of said end plates and end flanges. The column may be made of any suitably strong and chemically resistant material, of sufficient thickness to withstand the operating pressure, a ¾ inch thickness steel being preferred.

Prolonged contact between the reactants is accomplished by dividing the column into a plurality of reaction zones disposed in a series arrangement. Accordingly, the column 11 is provided with a plurality of vertically spaced baffle walls or separator plates 20, which define superimposed reaction zones 21. Each of the plates 20 is preferably of flat circular form, and is securely attached to the inside wall of the column 11, or to a cylindrical liner (not shown) for said column 11, which may be inserted after said plates 20 have been properly positioned within said liner.

The liquid and gaseous reactants are introduced respectively into the column 11 through a liquid inlet port 22 and a gas inlet port 23. The manner in which gaseous reactant is admitted into the column 11 is controlled by a gas dispersion valve 24 shown in Figs. 1 and 2. This valve 24 comprises a cylindrical body 25 having a hollow section 26 adapted to be threadedly attached to the outlet side of the gas inlet port 23, and a coaxially aligned central opening 27 of smaller internal diameter than said hollow section 26, and interconnecting therewith. The body 25 has a counter-sunk end 28 adapted to receive in spring engagement a valve 29 provided with a complementarily fitting conically-shaped valve head 30, preferably with a conical surface of greater angle than the countersunk end 28. An elongated stem 31 integral with said head 30 is slidably receivable in the opening 27, and is provided with a terminal nut 32 and a valve spring 33. Several port openings 34 in the body 25 and disposed parallel to the axis of the central opening 27 permit flow of reacting gas therethrough when the valve is in the disengaged or open position shown in Fig. 2.

According to the present invention, improved intimate contact between liquid and gas reactants may be effected in the column-type reactor 10 of the present invention. For the accomplishment of this purpose, each of the plates 20 is provided with an opening 35, and a tubular attachment or dispersion nozzle 36, see Fig. 3, having one end thereof fittingly receivable in the respective plate opening 35, and the other end thereof extending downwardly into the reacting zone 21 below said plate. Any number of nozzle openings 35 may be provided in each of the plates, a single central opening being preferred and illustrated in the drawing. The nozzle openings 36 permit reactant end product flow at greatly increased velocity, and in turbulent dispersion in an upward direction from one reaction zone to the successive zones thereabove. The final product may be removed through an outlet opening 38 in the plate 14.

Any number of columns may be used in any series or parallel relation desired, depending upon the degree of purity of product recovery desired. In the modification shown in Fig. 4, is shown a two pass column reactor 10a, composed of a pair of superposed columns 11a and 11b, similar to column 11 shown in Fig. 1, and arranged in such manner that the resultant product flow of one column 11a is further processed in the second column 11b thereabove.

In the production of calcium formate in the apparatus of the present invention, calcium hydroxide may be reacted with carbon monoxide at temperatures between 125° C. and 200° C., and under a pressure between 800 p.s.i. and 3,000 p.s.i. in the column 11 according to the following reaction:

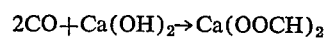

$$2CO + Ca(OH)_2 \rightarrow Ca(OOCH)_2$$

The carbon monoxide gas may be introduced into the lowermost reaction zone 21 through the dispersing nozzle 24, and the calcium hydroxide through the inlet port 22. Preferably the liquid and the gas inlets 22 and 23 are disposed in angularly convergent relationship to each other.

Due to the shape of the valve head 24, the carbon monoxide gas enters the reaction zone in the form of a thin cone-shaped film. Impingement of the calcium hydroxide slurry against this carbon monoxide gas film causes intimate interdispersion of liquid and gas. The higher pressure forces the dispersion of calcium hydroxide and carbon monoxide gas through the lowermost tubular nozzle, where the mixture of reactants is expanded and discharged into the next succeeding reaction zone 21 at a pressure somewhat below the pressure of the preceding reaction compartment. In similar manner, the mixture is forced through the remaining compartments along with corresponding reductions in pressure, and eventually emerges in final product form as calcium formate solution at the outlet port 38. When practicing the invention, steady state conditions are quickly obtained, the reacted material being held in constant and intimate association while undergoing reductions in pressure.

As conducive to a clearer understanding of the features of the present invention, it should be pointed out that there is a tendency for the dispersed calcium hydroxide slurry to unmix or accumulate into large bubbles, and thus reduce the area of contact between the calcium hydroxide and the surrounding carbon monoxide gas. The downwardly projecting nozzles 36 of the present invention prevent this coarsening of the bubble and drop sizes, in that they allow the mixture to be exposed to shear slippage at the lower extremity of the separator nozzles. Since there is a considerable pressure difference between the ends of the nozzle 36, whatever drops that may be formed in the turbulent mixture in the lower compartment are drawn through the high pressure inlet side of the nozzle, and dispersed through the lower pressure end of said nozzle, thereby reducing the liquid to mist consistency. In effect, the drops of liquid calcium hydroxide in the lower compartment are literally pulled into the nozzle 36 with such force that in passing over the nozzle edge, they are instantly sub-divided into a fine spray. This process is repeated as the mixture progresses from one compartment to another. As a result, the continuity of the spray effect is constantly preserved, so that intimate contact of the liquid calcium hydroxide with the gaseous carbon monoxide is effectively maintained and assured for substantially the length of the column 11. In this manner, formation of calcium formate product may be efficiently performed. Furthermore, the possibility of mechanical failure is minimized, as the nozzle dispersing apparatus 36 of the invention has no moving parts.

In order to indicate still more fully the nature of the present invention, the following examples of typical procedures are set forth, it being understood that these examples are presented as illustrative only, and that they are not intended to limit the scope of the invention.

*Example I*

A slurry containing 12 percent calcium hydroxide was introduced into the lower compartment of a reactor at a rate of 55 gallons per hour. Simultaneously, furnace gas was admitted into the reactor at a rate of 612 cubic feet per hour at a pressure of 1,300 p.s.i. The temperature of the mixture was 155° C. Analysis of the furnace gas was as follows:

| | Percent |
|---|---|
| CO | 78.0 |
| $CO_2$ | 3.3 |
| H | 11.0 |
| N | 7.0 |
| O | 0.7 |

The result of a one hour run yielded 63 pounds of calcium formate, which represents a yield of 81.5 percent.

*Example II*

A calcium hydroxide slurry having a composition similar to that of Example I was fed into the lower compartment of the reactor at a rate of 46 gallons per hour along with furnace gas at 648 cubic feet per hour, the furnace gas having a pressure of 1,200 p.s.i. The temperature of the mixture was 168° C. Upon the completion of a one hour period, 72.8 pounds of calcium formate was obtained, representing a yield of 90 percent.

It will be understood that modifications and variations may be effected without departing from the scope of the present invention. For example, although the reactor was constructed for the production of calcium formate, and is most suitable for that purpose, it is by no means limited to such. The present invention is adapted for the hydrogenation of oils, and is susceptible of utilization for reacting gases with liquids and gases with solids.

What is claimed is:

An apparatus for conducting a reaction between liquid and gaseous reactants comprising a reaction column having a feed chamber, a liquid feed passage for introducing a stream of said liquid reactant into said feed chamber, a gas feed valve for introducing a cone-shaped stream of said gaseous reactant into said feed chamber in impinging relationship to said stream of liquid reactant and a plurality of superposed reaction chambers above said feed chamber, each of said superposed chambers having an orificed plate constituting the lower wall thereof, and a hollow cylindrical tube-like attachment in each orifice of said plates, each attachment being perpendicularly disposed with respect to its associated plate and having at least a portion depending therefrom and extending into the chamber below, thereby affording means for expanding and discharging the reactants upwardly in the column successively through said reaction chambers in intimate and prolonged contact and at respectively successively reduced pressures during transit of said reactants.

References Cited in the file of this patent

UNITED STATES PATENTS

| 2,100,827 | Wiedbranck | Nov. 30, 1937 |
| 2,281,715 | Rogers | May 5, 1942 |
| 2,381,119 | Dill | Aug. 7, 1945 |
| 2,533,058 | Shaffer et al. | Dec. 5, 1950 |
| 2,609,277 | McNamara | Sept. 2, 1952 |
| 2,635,949 | Fenske et al. | Apr. 21, 1953 |
| 2,700,594 | Bills | Jan. 25, 1955 |
| 2,750,173 | Hartmann et al. | June 12, 1956 |